United States Patent
Takeda

(10) Patent No.: US 9,728,121 B2
(45) Date of Patent: Aug. 8, 2017

(54) ORGANIC EL DISPLAY PANEL WITH COLOR SHUTTER GLASS UNIT SELECTING A MONOCHROMATIC, A COLOR, A MONOCHROMATIC THREE-DIMENSIONAL AND A COLOR THREE-DIMENSIONAL DISPLAY MODE

(71) Applicant: Japan Display Inc., Tokyo (JP)

(72) Inventor: Nobuhiro Takeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 9 days.

(21) Appl. No.: 14/261,451

(22) Filed: Apr. 25, 2014

(65) Prior Publication Data
US 2014/0320551 A1    Oct. 30, 2014

(30) Foreign Application Priority Data

Apr. 26, 2013 (JP) ................... 2013-094094

(51) Int. Cl.
*G09G 5/00* (2006.01)
*G09G 3/3208* (2016.01)
*G02B 27/22* (2006.01)
*H04N 13/04* (2006.01)
*G09G 3/00* (2006.01)

(52) U.S. Cl.
CPC ....... *G09G 3/3208* (2013.01); *G02B 27/2264* (2013.01); *G09G 3/003* (2013.01); *H04N 13/0422* (2013.01); *H04N 13/0438* (2013.01); *H04N 13/0497* (2013.01); *G09G 2310/0235* (2013.01)

(58) Field of Classification Search
CPC .......... G09G 3/30; G09G 3/32; G09G 3/3208; G09G 3/3216; G09G 3/3225
USPC ............................ 345/76–83, 7–9; 315/169.3
See application file for complete search history.

(56) References Cited

U.S. PATENT DOCUMENTS

| | | | | |
|---|---|---|---|---|
| 6,031,328 A | * | 2/2000 | Nakamoto | ............... G09G 3/22 313/495 |
| 2003/0128218 A1 | * | 7/2003 | Struyk | ..................... G09G 5/02 345/581 |
| 2010/0177112 A1 | * | 7/2010 | Miyasaka | ............... G06F 21/84 345/589 |
| 2010/0214397 A1 | * | 8/2010 | Gaskevich | ......... G02B 27/2207 348/60 |

(Continued)

FOREIGN PATENT DOCUMENTS

JP        2004-279743         10/2004

*Primary Examiner* — Alexander Eisen
*Assistant Examiner* — Nelson Lam
(74) *Attorney, Agent, or Firm* — Typha IP LLC

(57) ABSTRACT

A display device allows an optimal display mode to be selected in accordance with the form of use, so that the total power consumption is decreased. The display device includes an organic EL display panel for displaying a monochromatic image; and a color shutter glass unit including a pair of shutters. The pair of shutters are each controllable to be in a light transmissive state for a first color, a second color and a third color or in a light non-transmissive state. The pair of shutters corresponding to left and right glasses are each controllable in synchronization with display of an image on the organic EL display panel, so that one of a monochromatic image display mode, a color image display mode, a monochromatic three-dimensional image display mode, and a color three-dimensional image display mode is selected.

2 Claims, 7 Drawing Sheets

(56) References Cited

U.S. PATENT DOCUMENTS

| | | | | |
|---|---|---|---|---|
| 2011/0050870 A1* | 3/2011 | Hanari | ............... | H04N 13/0438 |
| | | | | 348/56 |
| 2011/0292184 A1* | 12/2011 | de Greef | ................ | G09G 3/342 |
| | | | | 348/51 |
| 2012/0044333 A1* | 2/2012 | Kang | ................. | H04N 13/0438 |
| | | | | 348/56 |
| 2012/0062538 A1* | 3/2012 | Koyama | ................ | G02B 27/22 |
| | | | | 345/211 |
| 2012/0127382 A1* | 5/2012 | Hirakata | ........... | G02F 1/134363 |
| | | | | 349/13 |
| 2012/0133648 A1* | 5/2012 | Hirakata | ................ | G09G 3/342 |
| | | | | 345/419 |
| 2012/0236406 A1* | 9/2012 | Hur | .................... | H04N 13/0422 |
| | | | | 359/464 |
| 2013/0057545 A1* | 3/2013 | Nakahata | ............... | G09G 3/003 |
| | | | | 345/419 |
| 2013/0141452 A1* | 6/2013 | White | .................... | G09G 5/028 |
| | | | | 345/589 |

\* cited by examiner

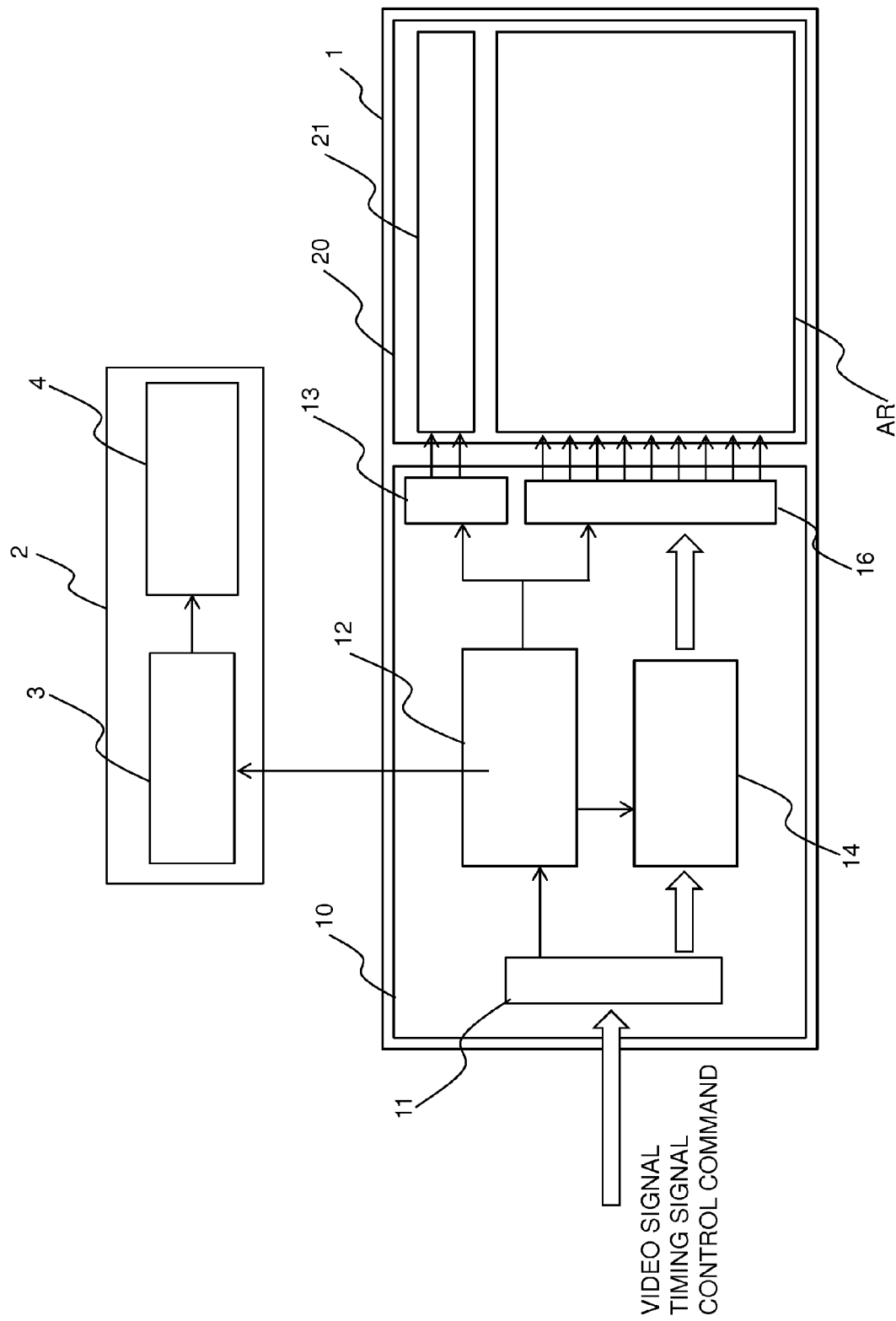

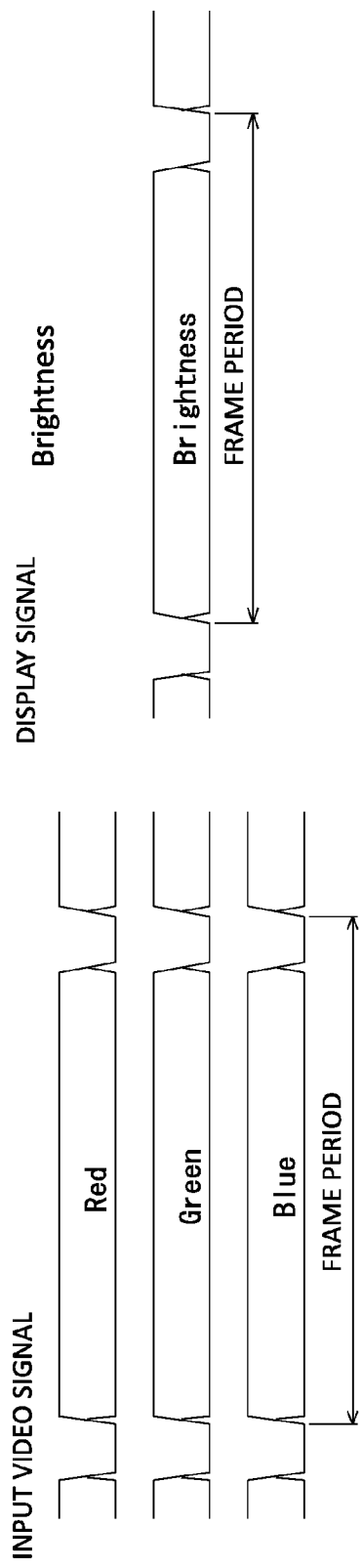

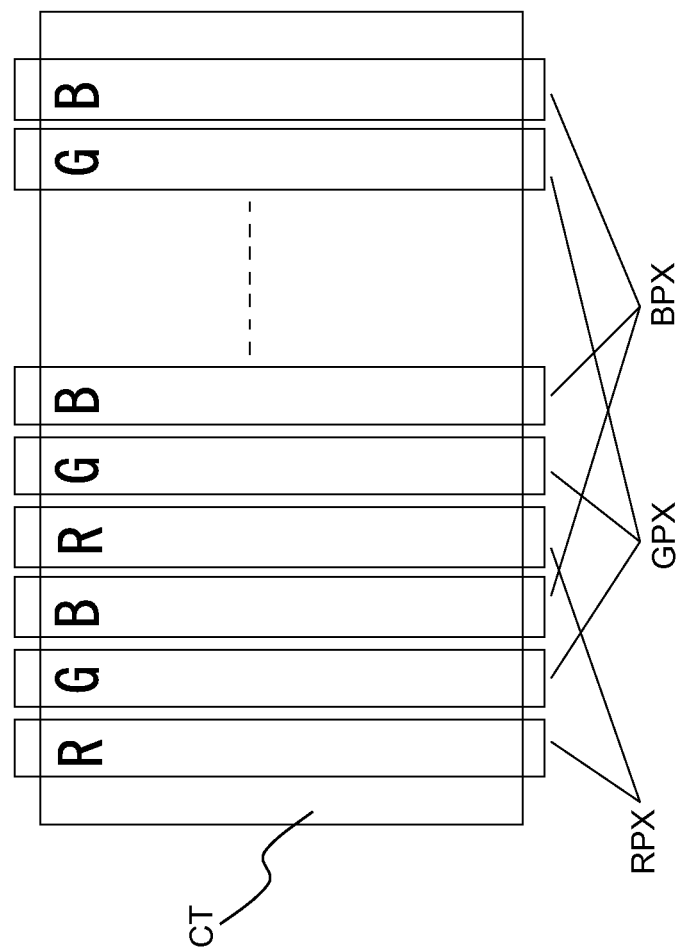

ORGANIC EL DISPLAY PANEL WITH COLOR SHUTTER GLASS UNIT SELECTING A MONOCHROMATIC, A COLOR, A MONOCHROMATIC THREE-DIMENSIONAL AND A COLOR THREE-DIMENSIONAL DISPLAY MODE

CROSS-REFERENCE TO RELATED APPLICATIONS

This application is based upon and claims the benefit of priority from the prior Japanese Patent Application No. 2013-094094, filed on Apr. 26, 2013, the entire contents of which are incorporated herein by reference.

FIELD

The present invention relates to a display device, and specifically to a technology effective for driving a display device at low power consumption.

BACKGROUND

Recently, demand for flat panel display devices has been increased. Especially, organic EL display devices using an organic EL (Electro Luminescence) element (OLED; Organic Light Emitting Diode) are excellent in power consumption, lightness, thinness, moving picture characteristics, viewing angle and the like, and are being actively developed and put into practice.

Organic EL display panels used for smart phones and the like have been improved in HD resolution. This has caused a problem of increased power consumption.

Smart phones are not required to provide high quality images in all of various forms of use. Therefore, the smart phones may be structured to allow a display mode thereof to be selected in accordance with the form of use, so that the power consumption is optimized. In this manner, the total power consumption can be decreased.

Demand for flat panel display devices capable of displaying three-dimensional images have been increased. Japanese Laid-Open Patent Publication No. 2004-279743 discloses a three-dimensional display device for displaying three-dimensional images which can be viewed by use of glasses.

Conventionally known display devices for mobile phones include reflection-type monochromatic display devices specialized for displaying images at low power consumption so as to be used for electronic books and the like, and high-definition color liquid crystal display devices and organic EL display devices specialized for displaying high quality images so as to be used for smart phones and the like.

Such conventional display devices for mobile phones do not allow display quality or power consumption to be selected in accordance with the form of use.

SUMMARY

Overviews of representative embodiments of the invention disclosed in the present application will be described, hereinafter.

A display device in an embodiment according to the present invention includes an organic EL display panel for displaying a monochromatic image; and a color shutter glass unit including a pair of shutters, each of the pair of shutters being controllable to be in a light transmissive state for a first color, a second color and a third color or in a light non-transmissive state. The pair of shutters are controllable in synchronization with display of an image on the organic EL display panel, so that one of a monochromatic image display mode, a color image display mode, a monochromatic three-dimensional image display mode, and a color three-dimensional image display mode is selected.

In another preferred embodiment, in the monochromatic image display mode, the organic EL display panel may display a monochromatic image, and the pair of shutters may be in the light transmissive state.

In still another preferred embodiment, in the color image display mode, the organic EL display panel sequentially may display, in one frame period, a first image based on gray scale data corresponding to an image of the first color, a second image based on gray scale data corresponding to an image of the second color, and a third image based on gray scale data corresponding to an image of the third color, and the pair of shutters may be sequentially switched, in the one frame period, to the light transmissive state for only the first color in synchronization with the display of the first image, to the light transmissive state for only the second color in synchronization with the display of the second image, and to the light transmissive state for only the third color in synchronization with the display of the third image.

In still another preferred embodiment, the pair of shutters may include a first shutter and a second shutter. In the monochromatic three-dimensional image display mode, the organic EL display panel sequentially may display a first image and a second image in one frame period, and the pair of shutters may be switched, in the one frame period, to a first state where the first shutter transmits light and the second shutter blocks light in synchronization with the display of the first image, and to a second state where the first shutter blocks light and the second shutter transmits light in synchronization with the display of the second image.

In still another preferred embodiment, the first image may be an image for a left eye and the second image may be an image for a right eye. The first shutter may be a shutter for the left eye and the second shutter may be a shutter for the right eye.

In still another preferred embodiment, the pair of shutters may include a first shutter and a second shutter. In the color three-dimensional image display mode, the organic EL display panel sequentially may display, in one frame period, a first image and a fourth image based on gray scale data corresponding to an image of the first color, a second image and a fifth image based on gray scale data corresponding to an image of the second color, and a third image and a sixth image based on gray scale data corresponding to an image of the third color, and the pair of shutters may be switched, in the one frame period, to a first state where the first shutter transmits light of only the first color and the second shutter blocks light in synchronization with the display of the first image, to a second state where the first shutter transmits light of only the second color and the second shutter blocks light in synchronization with the display of the second image, to a third state where the first shutter transmits light of only the third color and the second shutter blocks light in synchronization with the display of the third image, to a fourth state where the second shutter transmits light of only the first color and the first shutter blocks light in synchronization with the display of the fourth image, to a fifth state where the second shutter transmits light of only the second color and the first shutter blocks light in synchronization with the display of the fifth image, and to a sixth state where the second shutter transmits light of only the third color and the first shutter blocks light in synchronization with the display of the sixth image.

In still another preferred embodiment, the first image, the second image and the third image may be images for a left eye; the fourth image, the fifth image and the sixth image may be images for a right eye. The first shutter may be a shutter for the left eye and the second shutter may be a shutter for the right eye.

In still another preferred embodiment, the pair of shutters of the color shutter glass unit may each include a pair of polarizer plates; color filters of the first color, the second color and the third color, the color filters being provided between the pair of polarizer plates; a first electrode provided in correspondence with the color filter of the first color, a second electrode provided in correspondence with the color filter of the second color, and a third electrode provided in correspondence with the color filter of the third color, the first through third electrodes being provided between the pair of polarizer plates; a common electrode provided to face the first through third electrodes; and a liquid crystal layer provided between the first through third electrodes and the common electrode. A driving voltage to be input to the common electrode and each of the first through third electrode may be controllable such that the pair of shutters are each in any one of a light transmissive state, the light non-transmissive state, the light transmissive state for only the first color, the light transmissive state for only the second color, and the light transmissive state for only the third color.

A display device in an embodiment according to the present invention includes an organic EL display panel for displaying a monochromatic image; a color shutter glass unit including a pair of shutters, each of the pair of shutters being controllable to be in a light transmissive state for a first color, a second color and a third color or in a light non-transmissive state; and a control unit for controlling the pair of shutters in synchronization with the display of the monochromatic image.

In another preferred embodiment, the control unit may control the pair of shutters to be in the light transmissive state for one frame period.

In still another preferred embodiment, the control unit may perform switching to a first sub frame period, to a second sub frame period, and to a third sub frame period sequentially in one frame period. In the first sub frame period, a first image may be displayed on the display panel, and the pair of shutters may transmit light of only the first color. In the second sub frame period, a second image may be displayed on the display panel, and the pair of shutters may transmit light of only the second color. In the third sub frame period, a third image may be displayed on the display panel, and the pair of shutters may transmit light of only the third color.

In still another preferred embodiment, the pair of shutters may include a first shutter and a second shutter; and the control unit may perform switching to a first sub frame period and to a second sub frame period sequentially in one frame period. In the first sub frame period, a first image may be displayed on the display panel, the first shutter may transmit light, and the second shutter may block light. In the second sub frame period, a second image may be displayed on the display panel, the second shutter may transmit light, and the first shutter may block light.

In still another preferred embodiment, the first image may be an image for a left eye and the second image may be an image for a right eye. The first shutter may be a shutter for the left eye and the second shutter may be a shutter for the right eye.

In still another preferred embodiment, the pair of shutters may include a first shutter and a second shutter; and the control unit may perform switching to first through sixth sub frame periods in one frame period. In the first sub frame period, a first image may be displayed on the display panel, the first shutter may transmit light of only the first color, and the second shutter may block light. In the second sub frame period, a second image may be displayed on the display panel, the first shutter may transmit light of only the second color, and the second shutter may block light. In the third sub frame period, a third image may be displayed on the display panel, the first shutter may transmit light of only the third color, and the second shutter may block light. In the fourth sub frame period, a fourth image may be displayed on the display panel, the second shutter may transmit light of only the first color, and the first shutter may block light. In the fifth sub frame period, a fifth image may be displayed on the display panel, the second shutter may transmit light of only the second color, and the first shutter may block light. In the sixth sub frame period, a sixth image may be displayed on the display panel, the second shutter may transmit light of only the third color, and the first shutter may block light.

In still another preferred embodiment, the first image, the second image and the third image may be images for a left eye; the fourth image, the fifth image and the sixth image may be images for a right eye. The first shutter may be a shutter for the left eye and the second shutter may be a shutter for the right eye.

In still another preferred embodiment, the pair of shutters of the color shutter glass unit may each include a pair of polarizer plates; color filters of the first color, the second color and the third color, the color filters being provided between the pair of polarizer plates; a first electrode provided in correspondence with the color filter of the first color, a second electrode provided in correspondence with the color filter of the second color, and a third electrode provided in correspondence with the color filter of the third color, the first through third electrodes being provided between the pair of polarizer plates; a common electrode provided to face the first through third electrodes; and a liquid crystal layer provided between the first through third electrodes and the common electrode. A driving voltage to be input to the common electrode and each of the first through third electrode may be controllable such that the pair of shutters are each in a light transmissive state or a light non-transmissive state.

BRIEF DESCRIPTION OF DRAWINGS

FIG. 1 is a block diagram showing a schematic structure of a display device in an example according to the present invention;

FIG. 2A is provided to illustrate a video signal conversion method when the display device in the example according to the present invention is used in a monochromatic image display mode;

FIG. 2B is provided to illustrate a video signal conversion method when the display device in the example according to the present invention is used in a monochromatic image display mode;

FIG. 6 shows a schematic structure of a color shutter of a color shutter glass unit in the display device in the example according to the present invention.

DESCRIPTION OF EMBODIMENTS

Figure 3A:
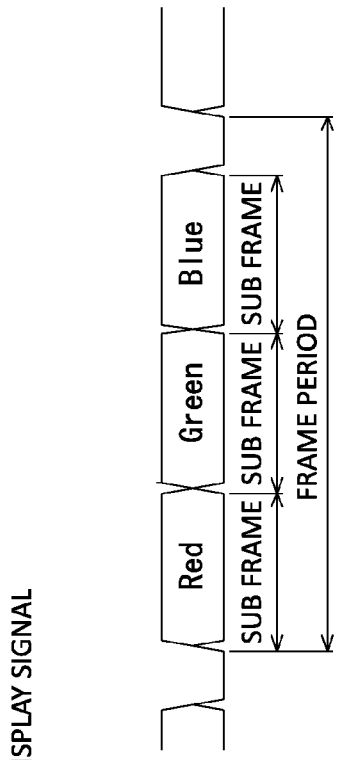
FIG. 3A is provided to illustrate a video signal conversion method when the display device in the example according to the present invention is used in a color image display mode.

The present invention is made to solve the above-described problem of the conventional art. The present invention has an object of providing a technology for allowing a display device to be used in an optimal mode selected in accordance with the form of use, so that the total power consumption can be decreased.

The above and other objects and novel features of the present invention will become clear upon reading this specification with reference to the attached drawings.

Hereinafter, an example according to the present invention will be described in detail with reference to the attached drawings.

In all the figures provided for describing the example, elements having the same functions will bear the same reference signs and will not be described in repetition. The following example is not provided to limit the interpretation of the scope of the present invention.

FIG. 1 is a block diagram showing a schematic structure of a display device in an example according to the present invention. The display device comprises an organic EL display device 1 and a color shutter glass unit 2.

The organic EL display device 1 in this example shown in FIG. 1 is a compact organic EL display device usable for, for example, a smart phone, a tablet computer or the like.

The organic EL display device 1 includes an organic EL driving circuit control unit 10 and an organic EL display panel 20. The organic EL display panel 20 includes video lines (not shown), scanning lines (not shown), and a scanning line driving circuit (also referred to as a "gate line driving circuit") 21 for supplying a driving signal to the scanning lines.

The organic EL driving circuit control unit 10 includes an interface circuit 11 to which a video signal, a timing control signal and a control command are to be input from an external image processing circuit (not shown), a control signal generation circuit 12 for generating a driving signal to be sent to the video lines or the scanning lines, a scanning line control circuit 13 for controlling the scanning line driving circuit 21, a frame memory 14 for storing image data input from an external device, and a video signal output circuit 16 for supplying the image data stored on the frame memory 14 to the video lines as a video signal.

The control signal generation circuit 12 generates a memory control signal for controlling the frame memory 14, based on the video signal, the timing control signal and the control command which are input from the external image processing device via the interface circuit 11. The control signal generation circuit 12 also generates a driving control signal for controlling the scanning line control circuit 13 or the video signal control circuit 16, and a glass control signal for controlling a glass control circuit 3 in order to control a pair of color shutters 4 in synchronization with display of a monochromatic image on the organic EL display panel 20. In other words, the organic EL driving circuit control unit 10 controls the pair of color shutters 4 in synchronization with display of a monochromatic image on the organic EL display panel 20.

The scanning line control circuit 13 controls the scanning line driving circuit 21 based on the driving control signal input from the control signal generation circuit 12. The scanning line driving circuit 21 sequentially supplies, in one frame period, selection voltages to the scanning lines in the organic EL display panel 20 based on a scanning line scan start signal which is input from the scanning line control circuit 13. The selection voltages are supplied to write video voltages onto pixels in the organic EL display panel 20.

The video signal which is input from the external image processing circuit is input to the frame memory 14 via the interface circuit 11.

The video signal read from the frame memory 14 is input to the video signal output circuit 16. The video signal output circuit 16 converts the video signal into a display signal of a data format, namely, an analog video voltage based on each of display modes. The video signal output circuit 16 outputs the post-conversion analog video voltage to the video lines in the organic EL display panel 20 based on a video voltage output timing signal which is input from the control signal generation circuit 12. As a result, an image is displayed in a display area AR of the organic EL display panel 20.

The organic EL display panel 20 in this example is an organic EL display panel for displaying a monochromatic image by, for example, a top emission method by use of a white light emitting layer.

The color shutter glass unit 2 in this example includes a pair of color shutters 4 corresponding to the right and left eyes, and the glass control circuit 3 for controlling the pair of color shutters 4 in synchronization with display of a monochromatic image on the organic EL display panel 20. The pair of color shutters 4 can each be controlled to be in a light transmissive state where light of any one of, or all of, a first color (e.g., red), a second color (e.g., green) and a third color (e.g., blue) is transmitted, or in a light non-transmissive state where light is blocked.

FIG. 2A and FIG. 2B are provided to illustrate a video signal conversion method when the display device in the example according to the present invention is in a monochromatic image display mode. FIG. 2A shows an input video signal and FIG. 2B shows a display signal.

In the monochromatic image display mode, an input video signal is converted into a display signal with no conversion in the timing. Gray scale data of the first color (e.g., red), gray scale data of the second color (e.g., green) and gray scale data of the third color (e.g., blue) each of which forms an input signal are converted into brightness data which forms a display signal. Based on the brightness data, a monochromatic image is displayed on the organic EL display panel 20.

The pair of color shutters 4 of the color shutter glass unit 2 are both put into the light transmissive state for the first color, the second color, and the third color. In other words, the organic EL driving circuit control unit 10 controls the pair of color shutters 4 to be in the light transmissive state for the first color, the second color, and the third color for one frame period. As a result, a viewer can view the monochromatic image.

Figure 3B:
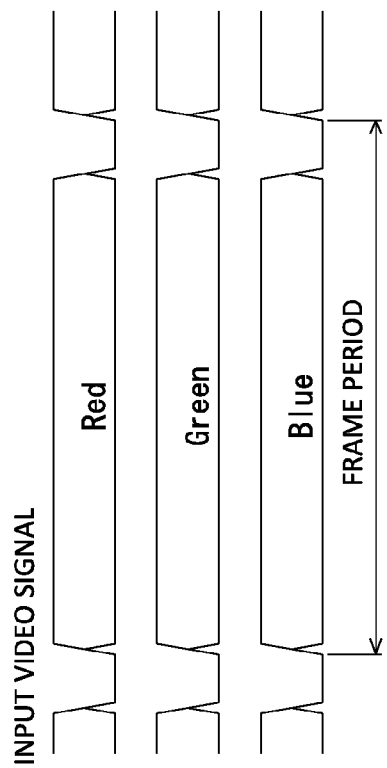
FIG. 3B is provided to illustrate a video signal conversion method when the display device in the example according to the present invention is used in a color image display mode.

FIG. 3A and FIG. 3B are provided to illustrate a video signal conversion method when the display device in the example according to the present invention is in a color image display mode. FIG. 3A shows an input video signal and FIG. 3B shows a display signal.

In the color image display mode, the organic EL driving circuit control unit 10 converts gray scale data of red (R), gray scale data of green (G) and gray scale data of blue (B) each of which forms an input signal into brightness data corresponding to red (R), brightness data corresponding to green (G) and brightness data corresponding to blue (B) which form a display signal. In addition, as shown FIG. 3A and FIG. 3B, the organic EL driving circuit control unit 10 converts the output period of the brightness data corresponding to each color and forming the display signal into ⅓ of the input period of the gray scale data of each color which forms the input video signal (one frame period). The output period of the brightness data corresponding to each color as shown in FIG. 3B is referred to as a "sub frame period".

The organic EL display panel 20 sequentially displays, in one frame period, a monochromatic image based on the gray scale data corresponding to a red (R) image, a monochromatic image based on the gray scale data corresponding to a green (G) image, and a monochromatic image based on the gray scale data corresponding to a blue (B) image.

In the one frame period described above, the pair of color shutters 4 of the color shutter glass unit 2 are sequentially switched into a light transmissive state where only red (R) light is transmitted, to a light transmissive state where only green (G) light is transmitted, and to a light transmissive state where only blue (B) light is transmitted in synchronization with the display of each monochromatic image on the organic EL display panel 20. As a result, the viewer can view a color image displayed by a field sequence method.

In other words, the organic EL driving circuit control unit 10 performs switching to a first sub frame period, to a second sub frame period, and to a third sub frame period sequentially in one frame period. In the first sub frame period, the monochromatic image based on the gray scale data corresponding to the red (R) image is displayed on the organic EL display panel 20, and the pair of color shutters 4 transmits only red (R) light. In the second sub frame period, the monochromatic image based on the gray scale data corresponding to the green (G) image is displayed on the organic EL display panel 20, and the pair of color shutters 4 transmits only green (G) light. In the third sub frame period, the monochromatic image based on the gray scale data corresponding to the blue (B) image is displayed on the organic EL display panel 20, and the pair of color shutters 4 transmits only blue (B) light.

Figure 4B:
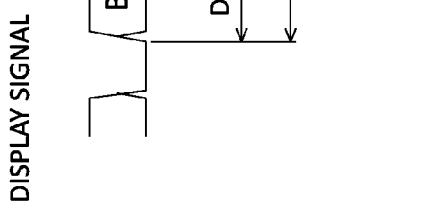
FIG. 4B is provided to illustrate a video signal conversion method when the display device in the example according to the present invention is used in a monochromatic three-dimensional image display mode.
Figure 4A:
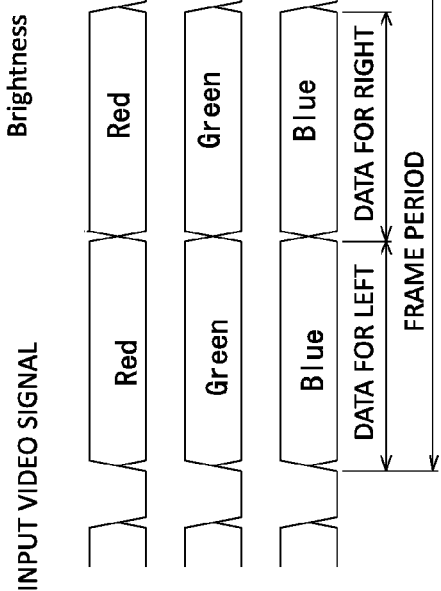
FIG. 4A is provided to illustrate a video signal conversion method when the display device in the example according to the present invention is used in a monochromatic three-dimensional image display mode.

FIG. 4A and FIG. 4B are provided to illustrate a video signal conversion method when the display device in the example according to the present invention is in a monochromatic three-dimensional image display mode. In the monochromatic three-dimensional image display mode, the pair of color shutters 4 include a first shutter for the left eye and a second shutter for the right eye. FIG. 4A shows an input video signal and FIG. 4B shows a display signal.

The input video signals shown in FIG. 4A respectively have gray scale data of red (R), green (G) and blue (B) for the left eye in a first half of the frame period, and gray scale data of red (R), green (G) and blue (B) for the right eye in a second half of the frame period. Based on a display signal of the monochromatic three-dimensional image display mode shown in FIG. 4B, the organic EL display panel 20 sequentially displays, in one frame period, a first monochromatic image based on the gray scale data of each of red (R), green (G) and blue (B) for the left eye and a second monochromatic image based on the gray scale data of each of red (R), green (G) and blue (B) for the right eye.

As shown in FIG. 4A and FIG. 4B, the organic EL driving circuit control unit 10 generates a display signal by converting the gray scale data of each of red (R), green (G) and blue (B) for the left eye into brightness data for the left eye, and converting the gray scale data of each of red (R), green (G) and blue (B) for the right eye into brightness data for the right eye. The brightness data for the left eye is displayed in a first half of the frame period of the display signal (about ½ frame period), and the brightness data for the right eye is displayed in a second half of the frame period of the display signal (about ½ frame period). Based on such brightness data (display signal), the organic EL display panel 20 displays a monochromatic image for the left eye and a monochromatic image for the right eye alternately (e.g., displays each image for about ½ frame period).

The pair of color shutters 4 of the color shutter glass unit 2 are sequentially switched to a first state where the first color shutter for the left eye transmits light of the first color, the second color, and the third color and the second color shutter for the right eye blocks light in synchronization with the display of the first monochromatic image for the left eye on the organic EL display panel 20, and to a second state where the first color shutter for the left eye blocks light and the second color shutter for the right eye transmits light of the first color, the second color, and the third color in synchronization with the display of the second monochromatic image for the right eye on the organic EL display panel 20. As a result, the viewer can view a monochromatic three-dimensional image.

In other words, the organic EL driving circuit control unit 10 performs switching to a first sub frame period and to a second sub frame period sequentially in one frame period. In the first sub frame period, the first monochromatic image for the left eye is displayed on the organic EL display panel 20. The first shutter for the left eye transmits light of the first color, the second color, and the third color and the second shutter for the right eye blocks light. In the second sub frame period, the second monochromatic image for the right eye is displayed on the organic EL display panel 20. The second shutter for the right eye transmits light of the first color, the second color, and the third color and the first shutter for the left eye blocks light.

Figure 5A:
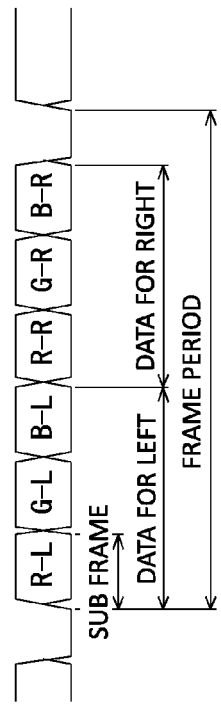
FIG. 5A is provided to illustrate a video signal conversion method when the display device in the example according to the present invention is used in a color three-dimensional image display mode.
Figure 5B:
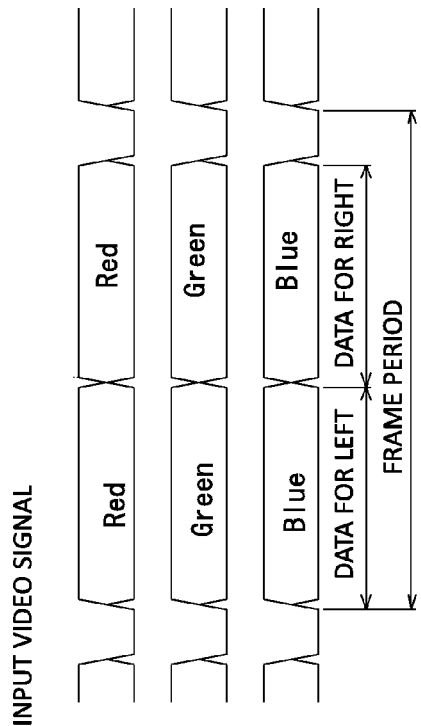
FIG. 5B is provided to illustrate a video signal conversion method when the display device in the example according to the present invention is used in a color three-dimensional image display mode.

FIG. 5A and FIG. 5B are provided to illustrate a video signal conversion method when the display device in the example according to the present invention is in a color three-dimensional image display mode. In the color three-dimensional image display mode, the pair of color shutters 4 include a first shutter for the left eye and a second shutter for the right eye. FIG. 5A shows an input video signal and FIG. 5B shows a display signal.

The input video signals shown in FIG. 5A respectively have gray scale data of red (R), green (G) and blue (B) for the left eye in a first half of the frame period, and gray scale data of red (R), green (G) and blue (B) for the right eye in a second half of the frame period. Based on a display signal of the color three-dimensional image display mode shown in FIG. 5B, the organic EL display panel 20 sequentially displays, in one frame period, first, second and third monochromatic images based on the gray scale data of red (R), green (G) and blue (B) for the left eye and fourth, fifth and sixth monochromatic images based on the gray scale data of red (R), green (G) and blue (B) for the right eye.

As shown in FIG. 5A and FIG. 5B, the organic EL driving circuit control unit 10 generates a display signal by respectively converting gray scale data of red (R), green (G) and blue (B) for the left eye into brightness data of red (R), green (G) and blue (B) for the left eye, and respectively converting gray scale data of red (R), green (G) and blue (B) for the right eye into brightness data of red (R), green (G) and blue (B) for the right eye. As shown in FIG. 5B, the brightness data of red (R), green (G) and blue (B) for the left eye is displayed in a first half of the frame period of the display signal (about ½ frame period). For example, the brightness data of each of red (R), green (G) and blue (B) for the left eye is displayed for about ⅙ frame period. The brightness data of red (R), green (G) and blue (B) for the right eye is displayed in a second half of the frame period of the display signal (about ½ frame period). For example, the brightness data of each of red (R), green (G) and blue (B) for the right eye is displayed for about ⅙ frame period. Based on such brightness data, the organic EL display panel 20 sequentially displays a monochromatic image of each of red (R), green (G) and blue (B) for the left eye and a monochromatic image of each of red (R), green (G) and blue (B) for the right eye (e.g., displays each image for about ⅙ frame period).

The pair of color shutters 4 of the color shutter glass unit 2 are sequentially switched to a first state where the first color shutter for the left eye transmits only red (R) light and the second color shutter for the right eye blocks light in synchronization with the display of the first monochromatic image for the left eye on the organic EL display panel 20, to a second state where the first color shutter for the left eye transmits only green (G) light and the second color shutter for the right eye blocks light in synchronization with the display of the second monochromatic image for the left eye on the organic EL display panel 20, to a third state where the first color shutter for the left eye transmits only blue (B) light and the second color shutter for the right eye blocks light in synchronization with the display of the third monochromatic image for the left eye on the organic EL display panel 20, to a fourth state where the second color shutter for the right eye transmits only red (R) light and the first color shutter for the left eye blocks light in synchronization with the display of the fourth monochromatic image for the right eye on the organic EL display panel 20, to a fifth state where the second color shutter for the right eye transmits only green (G) light and the first color shutter for the left eye blocks light in synchronization with the display of the fifth monochromatic image for the right eye on the organic EL display panel 20, and to a sixth state where the second color shutter for the right eye transmits only blue (B) light and the first color shutter for the left eye blocks light in synchronization with the display of the sixth monochromatic image for the right eye on the organic EL display panel 20.

In other words, the organic EL driving circuit control unit 10 performs switching to first through sixth sub frame periods sequentially in one frame period. In the first sub frame period, the first monochromatic image for the left eye based on the gray scale data corresponding to the red (R) image is displayed on the organic EL display panel 20. The first shutter for the left eye transmits only red (R) light, and the second shutter for the right eye blocks light. In the second sub frame period, the second monochromatic image for the left eye based on the gray scale data corresponding to the green (G) image is displayed on the organic EL display panel 20. The first shutter for the left eye transmits only green (G) light, and the second shutter for the right eye blocks light. In the third sub frame period, the third monochromatic image for the left eye based on the gray scale data corresponding to the blue (B) image is displayed on the organic EL display panel 20. The first shutter for the left eye transmits only blue (B) light, and the second shutter for the right eye blocks light. In the fourth sub frame period, the fourth monochromatic image for the right eye based on the gray scale data corresponding to the red (R) image is displayed on the organic EL display panel 20. The second shutter for the right eye transmits only red (R) light, and the first shutter for the left eye blocks light. In the fifth sub frame period, the fifth monochromatic image for the right eye based on the gray scale data corresponding to the green (G) image is displayed on the organic EL display panel 20. The second shutter for the right eye transmits only green (G) light, and the first shutter for the left eye blocks light. In the sixth sub frame period, the sixth monochromatic image for the right eye based on the gray scale data corresponding to the blue (B) image is displayed on the organic EL display panel 20. The second shutter for the right eye transmits only blue (B) light, and the first shutter for the left eye blocks light.

As a result, the viewer can view a color three-dimensional image displayed by the field sequence method.

FIG. 6 shows a schematic structure of one of the color shutters 4 of the color shutter glass unit 2 of the display device in the example according to the present invention.

Figure 7:
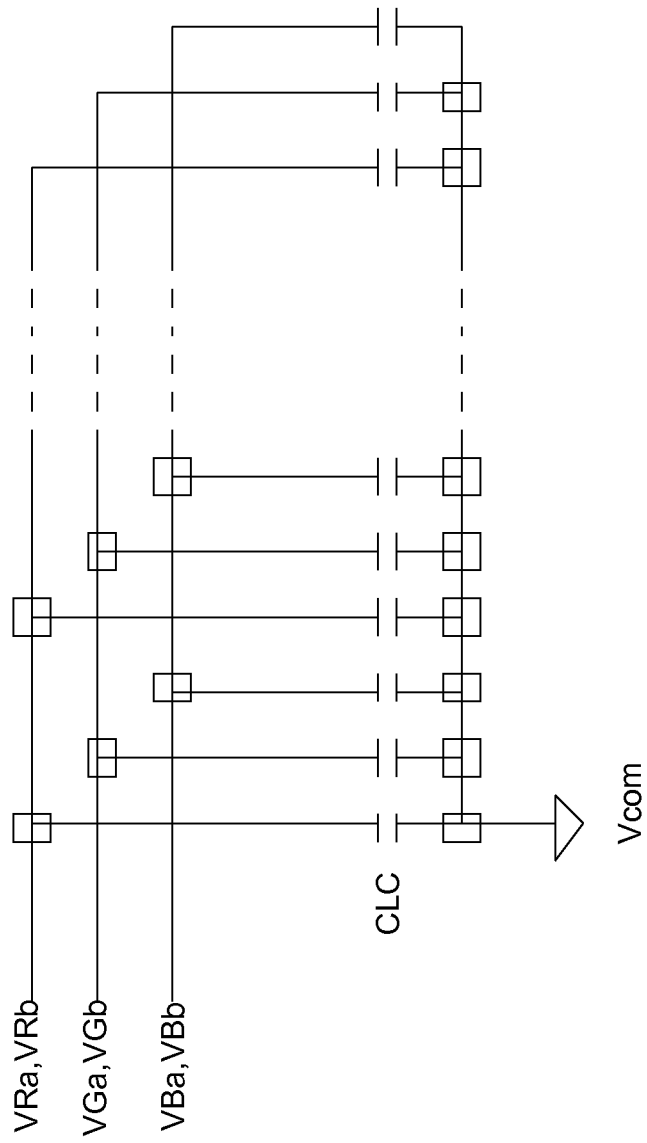
FIG. 7 is a circuit diagram showing a circuit configuration of the color shutter of the color shutter glass unit in the display device in the example according to the present invention.

FIG. 7 is a circuit diagram showing a circuit configuration of the glass control circuit 3 of the color shutter glass unit 2 of the display device in the example according to the present invention.

As shown in FIG. 6, each of the color shutters 4 of the color shutter glass unit 2 in this example includes red (R), green (G) and blue (B) color filters, R electrodes (RPX) respectively provided in correspondence with the red (R) color filters, G electrodes (GPX) respectively provided in correspondence with the green (G) color filters, B electrodes (BPX) respectively provided in correspondence with the blue (B) color filters, a common electrode (CT) provided to face the R electrodes (RPX), the G electrodes (GPX) and the B electrodes (BPX), and a liquid crystal layer (not shown) provided between the R, G and B electrodes (RPX, GPX and BPX) and the common electrode (CT).

The common electrode (CT), the R electrodes (RPX), the G electrodes (GPX), the B electrodes (BPX), and the red (R), green (G) and blue (B) color filters are located between a pair of polarizer plates. In FIG. 7, "CLC" refers to a liquid crystal capacitance.

The pair of polarizer plates have polarization axes perpendicular to each other. The common electrode (CT), the R electrodes (RPX), the G electrodes (GPX), and the B electrodes (BPX) may be each formed of a transparent electrode (of, for example, ITO or the like).

Positions of the red (R), green (G) and blue (B) color filters may be set at a lower resolution than the precision of the organic EL display panel 20.

The color shutters 4 for left and right glasses of the color shutter glass unit 2 in this example each act as a shutter when the common electrode (CT) is supplied with a common voltage (Vcom) and the R electrodes (RPX) are supplied with a voltage for providing the light transmissive state (VRa) or a voltage for providing the light non-transmissive state (VRb). Similarly, the color shutters 4 each act as a shutter when the common electrode (CT) is supplied with the common voltage (Vcom) and the G electrodes (GPX) are supplied with a voltage for providing the light transmissive state (VGa) or a voltage for providing the light non-transmissive state (VGb). Similarly, the color shutters 4 each act as a shutter when the common electrode (CT) is supplied with the common voltage (Vcom) and the B electrodes (BPX) are supplied with a voltage for providing the light transmissive state (VBa) or a voltage for providing the light non-transmissive state (VBb).

In, for example, the monochromatic image display mode, the R electrodes (RPX), the G electrodes (GPX) and the B electrodes (BPX) of each of the pair of color shutters 4 of the color shutter glass unit 2 are supplied with a voltage for providing the light transmissive state (VRa, VGa, VBa). Thus, both of the pair of color shutters 4 of the color shutter glass unit 2 are put into the light transmissive state for the first color, the second color, and the third color. As a result, the viewer can view a monochromatic image displayed on the organic EL display panel 20.

In the color image display mode, in the first sub frame period shown in FIG. 3B, the R electrodes (RPX) of each of the pair of color shutters 4 of the color shutter glass unit 2 are supplied with a voltage for providing the light transmissive state (VRa), and the G electrodes (GPX) and the B electrodes (BPX) are supplied with a voltage for providing the light non-transmissive state (VGb, VBb). Thus, both of the pair of color shutters 4 are put into a state where only red (R) light is transmitted. In the next sub frame period, the G electrodes (GPX) of each of the pair of color shutters 4 of the color shutter glass unit 2 are supplied with a voltage for providing the light transmissive state (VGa), and the R electrodes (RPX) and the B electrodes (BPX) are supplied with a voltage for providing the light non-transmissive state (VRb, VBb). Thus, both of the pair of color shutters 4 are put into a state where only green (G) light is transmitted. In the final sub frame period, the B electrodes (BPX) of each of the pair of color shutters 4 of the color shutter glass unit 2 are supplied with a voltage for providing the light transmissive state (VBa), and the R electrodes (RPX) and the G electrodes (GPX) are supplied with a voltage for providing the light non-transmissive state (VRb, VGb). Thus, both of the pair of color shutters 4 are put into a state where only blue (B) light is transmitted.

As a result, the viewer can view, through the color shutters 4, a monochromatic image of each of red (R), green (G) and blue (B) displayed on the organic EL display panel 20 for the corresponding sub frame period (e.g., about ⅓ frame period). Therefore, the viewer can view a color image displayed by the field sequence method.

In the monochromatic three-dimensional image display mode, in the first half of the frame period, the R electrodes (RPX), the G electrodes (GPX) and the B electrodes (BPX) of the color shutter 4 for the left eye of the color shutter glass unit 2 are supplied with a voltage for providing the light transmissive state (VRa, VGa, VBa), and the R electrodes (RPX), the G electrodes (GPX) and the B electrodes (BPX) of the color shutter 4 for the right eye of the color shutter glass unit 2 are supplied with a voltage for providing the light non-transmissive state (VRb, VGb, VBb). Thus, the color shutter 4 for the left eye is put into the light transmissive state for the first color, the second color, and the third color and the color shutter 4 for the right eye is put into the light non-transmissive state. In the second half of the frame period, the R electrodes (RPX), the G electrodes (GPX) and the B electrodes (BPX) of the color shutter 4 for the left eye of the color shutter glass unit 2 are supplied with a voltage for providing the light non-transmissive state (VRb, VGb, VBb), and the R electrodes (RPX), the G electrodes (GPX) and the B electrodes (BPX) of the color shutter 4 for the right eye of the color shutter glass unit 2 are supplied with a voltage for providing the light transmissive state (VRa, VGa, VBa). Thus, the color shutter 4 for the left eye is put into the light non-transmissive state and the color shutter 4 for the right eye is put into the light transmissive state for the first color, the second color, and the third color. As a result, the viewer can view a monochromatic view for the left eye displayed on the organic EL display panel 20 with his/her left eye and can view a monochromatic view for the right eye displayed on the organic EL display panel 20 with his/her right eye alternately (e.g., can view each image for about ½ frame period). Therefore, the viewer can view a monochromatic three-dimensional image.

In the color three-dimensional image display mode, in the first half of the frame period shown in FIG. 5B, the R electrodes (RPX), the G electrodes (GPX) and the B electrodes (BPX) of the color shutter 4 for the right eye of the color shutter glass unit 2 are supplied with a voltage for providing the light non-transmissive state (VRb, VGb, VBb). Thus, the color shutter 4 for the right eye is put into the light non-transmissive state.

In the first sub frame period of the first half of the frame period, the R electrodes (RPX) of the color shutter 4 for the left eye of the color shutter glass unit 2 are supplied with a voltage for providing the light transmissive state (VRa), and the G electrodes (GPX) and the B electrodes (BPX) are supplied with a voltage for providing the light non-transmissive state (VGb, VBb). Thus, the color shutter 4 for the left eye is put into a state where only red (R) light is transmitted. In the second sub frame period, the G electrodes (GPX) of the color shutter 4 for the left eye of the color shutter glass unit 2 are supplied with a voltage for providing the light transmissive state (VGa), and the R electrodes (RPX) and the B electrodes (BPX) are supplied with a voltage for providing the light non-transmissive state (VRb, VBb). Thus, the color shutter 4 for the left eye is put into a state where only green (G) light is transmitted. In the third sub frame period, the B electrodes (BPX) of the color shutter 4 for the left eye of the color shutter glass unit 2 are supplied with a voltage for providing the light transmissive state (VBa), and the R electrodes (RPX) and the G electrodes (GPX) are supplied with a voltage for providing the light non-transmissive state (VRb, VGb). Thus, the color shutter 4 for the left eye is put into a state where only blue (B) light is transmitted.

Also in the color three-dimensional image display mode, in the second half of the frame period shown in FIG. 5B, the R electrodes (RPX), the G electrodes (GPX) and the B electrodes (BPX) of the color shutter 4 for the left eye of the color shutter glass unit 2 are supplied with a voltage for providing the light non-transmissive state (VRb, VGb, VBb). Thus, the color shutter 4 for the left eye is put into the light non-transmissive state.

In the first sub frame period of the second half of the frame period (i.e., the fourth sub frame period), the R electrodes (RPX) of the color shutter 4 for the right eye of the color shutter glass unit 2 are supplied with a voltage for providing the light transmissive state (VRa), and the G electrodes (GPX) and the B electrodes (BPX) are supplied with a voltage for providing the light non-transmissive state (VGb, VBb). Thus, the color shutter 4 for the right eye is put into a state where only red (R) light is transmitted. In the fifth sub frame period, the G electrodes (GPX) of the color shutter 4 for the right eye of the color shutter glass unit 2 are supplied with a voltage for providing the light transmissive state (VGa), and the R electrodes (RPX) and the B electrodes (BPX) are supplied with a voltage for providing the light non-transmissive state (VRb, VBb). Thus, the color shutter 4 for the right eye is put into a state where only green (G) light is transmitted. In the sixth sub frame period, the B electrodes (BPX) of the color shutter 4 for the right eye of the color shutter glass unit 2 are supplied with a voltage for providing the light transmissive state (VBa), and the R electrodes (RPX) and the G electrodes (GPX) are supplied with a voltage for providing the light non-transmissive state (VRb, VGb). Thus, the color shutter 4 for the right eye is put into a state where only blue (B) light is transmitted.

As a result, the viewer can, through the color shutters 4, view a monochromatic image of each of red (R), green (G) and blue (B) for the left eye displayed on the organic EL display panel 20 for the corresponding sub frame period of the first half of the frame period (e.g., about ⅙ frame period) with his/her left eye, and can view a monochromatic image of each of red (R), green (G) and blue (B) for the right eye displayed on the organic EL display panel 20 for the corresponding sub frame period of the second half of the frame period (e.g., about ⅙ frame period) with his/her right eye. Therefore, the viewer can view a color three-dimensional image displayed by the field sequence method.

The organic EL display panel in this example provides monochromatic display. As compared with a conventional organic EL display panel of a color filter method (W-RGB method) that uses a white light emitting layer and displays a color image through color filters, the organic EL display panel in this example has an aperture ratio three times higher. In addition, the organic EL display panel in this example, which does not include color filters, can improve the light extraction efficiency.

In the above description, signals of red (R), green (G) and blue (B) may be replaced with a brightness signal (Y), a color difference signal (U(B−Y)) and a color difference signal (V(R−Y)).

As described above, the display device according to the present invention allows an optimal display mode to be selected in accordance with the form of use, so that the total power consumption can be decreased.

So far, the present invention made by the present inventor has been specifically described by way of an example. The present invention is not limited to the above-described example and may be modified in any of various manners without departing from the gist of the invention, needless to say.

What is claimed is:
1. A display device, comprising:
an organic EL display panel displaying a monochromatic image; and
a color shutter glass unit including a pair of shutters, each of the pair of shutter glasses, the pair of shutter glasses having a first shutter for a left eye and a second shutter for a right eye; wherein
the color shutter glass unit has a first mode, a second mode, a third mode and a fourth mode,
the first shutters have a first red shutter, a first green shutter and a first blue shutter, the first red shutter includes a red color filter, the first green shutter includes a green color filter and the first blue shutter includes a blue color filter, the second shutters have a second red shutter, a second green shutter and a second blue shutter, the second red shutter includes a red color filter, the second green shutter includes a green color filter and the second blue shutter includes a blue color filter,
the organic EL display panel and the color shutter glass unit operate in a plurality of frame periods,
in the first mode
the first shutters and the second shutters are opened, and the organic EL display panel displays the monochromatic image within each of the frame periods,
in the second mode
each of the frame periods has a first sub-frame and a second sub-frame, the first sub-frame not overlapping with the second sub-frame,
the first shutters are opened, the second shutters are closed and the organic EL display panel displays the monochromatic image for the left eye within the first sub-frame,
the first shutters are closed, the second shutters are opened and the organic EL display panel displays the monochromatic image for the right eye within the second sub-frame,
in the third mode
each of the frame periods has a third sub-frame, a fourth sub-frame and a fifth sub-frame, the third sub-frame, the fourth sub-frame and the fifth sub-frame not overlapping each other,
the first red shutter and the second red shutter are opened, the first green shutter, the first blue shutter, the second green shutter and the second blue shutter are closed and the organic EL display panel displays the monochromatic image for a red image within the third sub-frame,
the first green shutter and the second green shutter are opened, the first red shutter, the first blue shutter, the second red shutter and the second blue shutter are closed and the organic EL display panel displays the monochromatic image for a green image within the fourth sub-frame,
the first blue shutter and the second blue shutter are opened, the first red shutter, the first green shutter, the second red shutter and the second green shutter are closed and the organic EL display panel displays the monochromatic image for a blue image within the fifth sub-frame,
in the fourth mode
each of the frame periods has a sixth sub-frame, a seventh sub-frame, an eighth sub-frame, a ninth sub-frame, a tenth sub-frame and an eleventh sub-frame, the sixth sub-frame, the seventh sub-frame, the eighth sub-frame, the ninth sub-frame, the tenth sub-frame and the eleventh sub-frame not overlapping each other,
the first red shutter is opened, the first green shutter, the first blue shutter, the second red shutter, the second green shutter and the second blue shutter are closed and the organic EL display panel displays the monochromatic image for the left eye and a red image within the sixth sub-frame,
the first green shutter is opened, the first red shutter, the first blue shutter, the second red shutter, the second green shutter and the second blue shutter are closed and the organic EL display panel displays the monochromatic image for the left eye and a green image within the seventh sub-frame, the first blue shutter is opened, the first red shutter, the first green shutter, the second red shutter, the second green shutter and the second blue shutter are closed and the organic EL display panel displays the monochromatic image for the left eye and a blue image within the eighth sub-frame, the second red shutter is opened, the first red shutter, the first green shutter, the first blue shutter, the second green shutter and the second blue shutter are closed and the organic EL display panel displays the monochromatic image for the right eye and a red image within the ninth sub-frame, the second green shutter is opened, the first red shutter, the first green shutter, the first blue shutter, the second red shutter and the second blue shutter are closed and the organic EL display panel displays the monochromatic image for the right eye and a green image within the tenth sub-frame, the second blue shutter is opened, the first red shutter, the first green shutter, the first blue shutter, the second red shutter and the second green shutter are closed and the organic EL display panel displays the monochromatic image for the right eye and a blue image within the eleventh sub-frame.

2. A display device, comprising:

an organic EL display panel displaying a monochromatic image; and a color shutter glass unit including a pair of shutter glasses, the pair of shutter glasses having a first shutter for a left eye and a second shutter for a right eye; wherein the color shutter glass unit has a first mode and a second mode, the first shutters have a first red shutter, a first green shutter and a first blue shutter, the first red shutter includes a red color filter, the first green shutter includes a green color filter and the first blue shutter includes a blue color filter, the second shutters have a second red shutter, a second green shutter and a second blue shutter, the second red shutter includes a red color filter, the second green shutter includes a green color filter and the second blue shutter includes a blue color filter, the organic EL display panel and the color shutter glass unit operate in a plurality of frame periods, an operation of the organic EL display panel and the color shutter glass unit is switched in each of the frame periods, in the first mode the first shutters and the second shutters are opened, and the organic EL display panel displays the monochromatic image within each of the frame periods, in the second mode each of the frame periods has a first sub-frame, a second sub-frame and a third sub-frame, the first sub-frame, the second sub-frame and the third sub-frame not overlapping each other, the first red shutter and the second red shutter are opened, the first green shutter, the first blue shutter, the second green shutter and the second blue shutter are closed and the organic EL display panel displays the monochromatic image for a red image within the first sub-frame, the first green shutter and the second green shutter are opened, the first red shutter, the first blue shutter, the second red shutter and the second blue shutter are closed and the organic EL display panel displays the monochromatic image for a green image within the second sub-frame, the first blue shutter and the second blue shutter are opened, the first red shutter, the first green shutter, the second red shutter and the second green shutter are closed and the organic EL display panel displays the monochromatic image for a blue image within the third sub-frame.

\* \* \* \* \*